Dec. 5, 1950 K. SCHLESINGER 2,532,338
PULSE COMMUNICATION SYSTEM
Filed Nov. 15, 1945 3 Sheets-Sheet 1
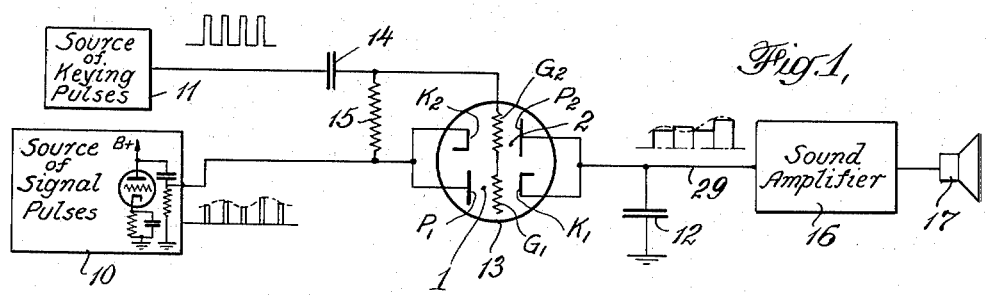
Fig. 1.
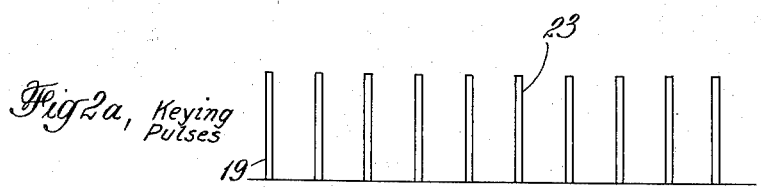
Fig. 2a, Keying Pulses
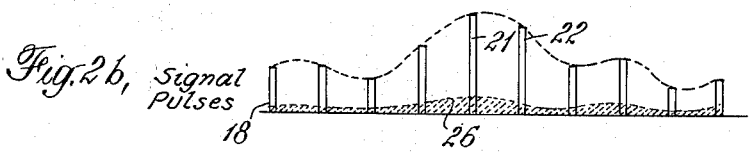
Fig. 2b, Signal Pulses
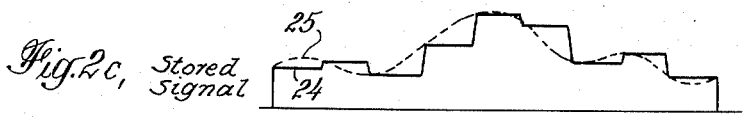
Fig. 2c, Stored Signal
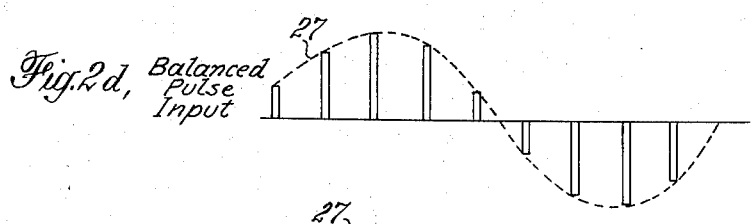
Fig. 2d, Balanced Pulse Input
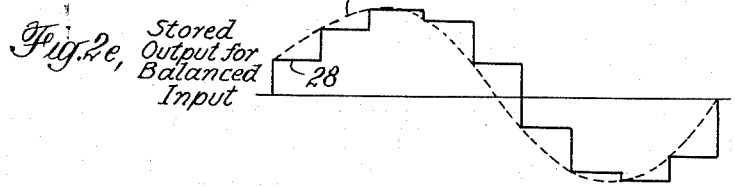
Fig. 2e, Stored Output for Balanced Input
INVENTOR
KURT SCHLESINGER
BY
Pennie, Davis, Marvin & Edmonds
ATTORNEYS

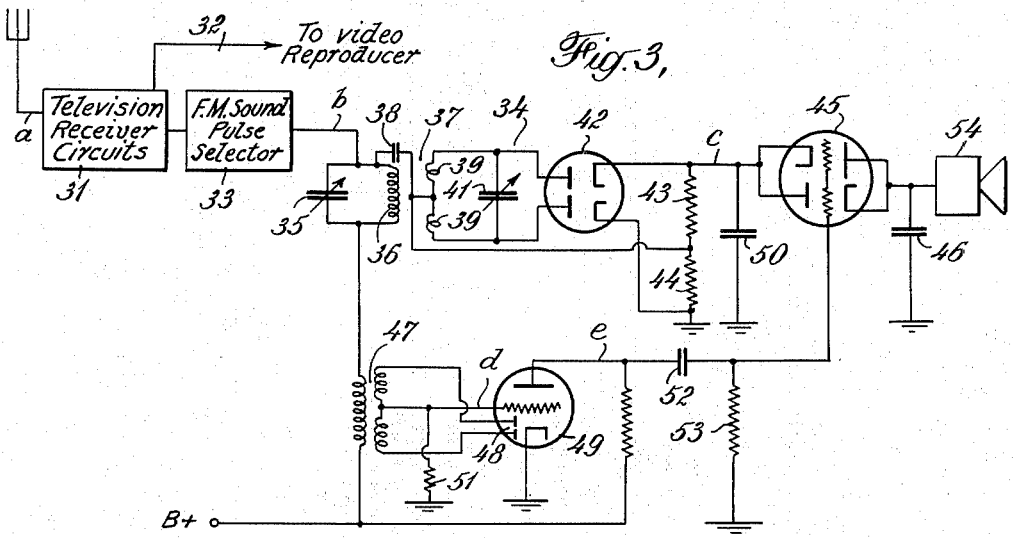
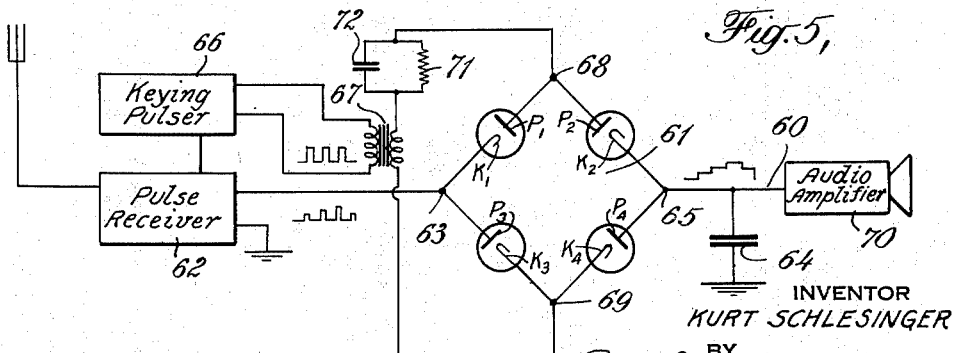

Dec. 5, 1950  K. SCHLESINGER  2,532,338
PULSE COMMUNICATION SYSTEM
Filed Nov. 15, 1945   3 Sheets-Sheet 3
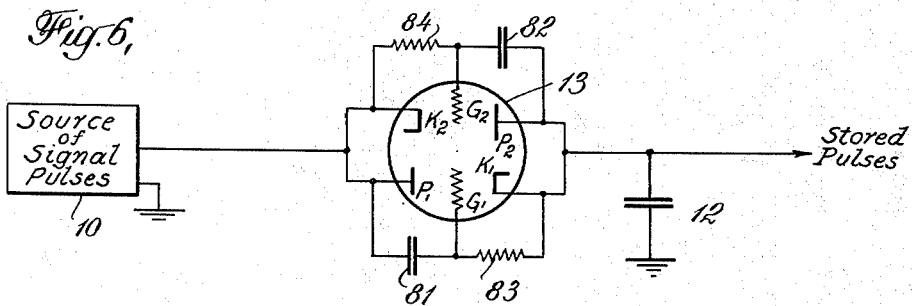
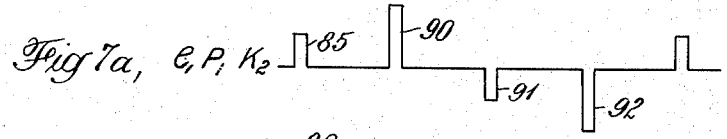
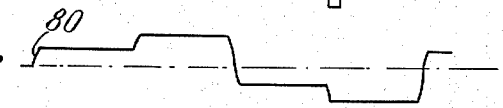
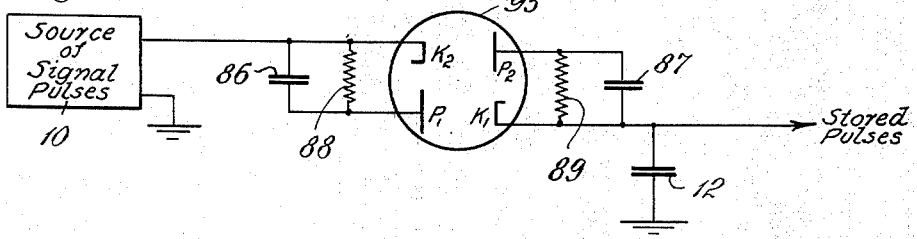
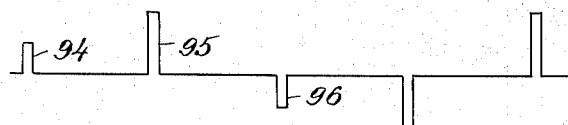
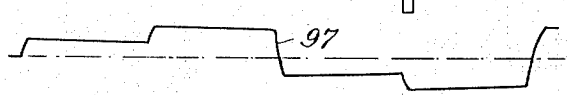
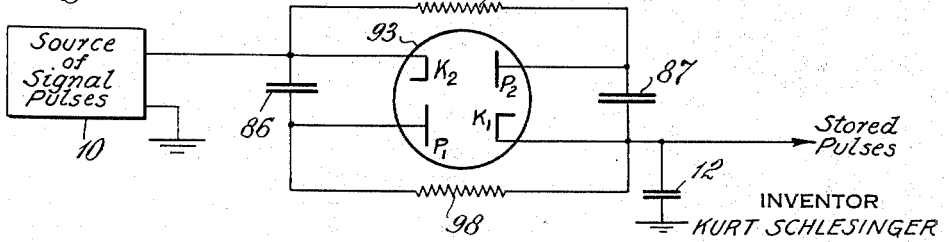
INVENTOR
KURT SCHLESINGER
BY
Pennie, Davis, Marvin & Edmonds
ATTORNEYS Patented Dec. 5, 1950

2,532,338

UNITED STATES PATENT OFFICE 2,532,388

PULSE COMMUNICATION SYSTEM

Kurt Schlesinger, New York, N. Y., assignor to Columbia Broadcasting System, Inc., New York, N. Y., a corporation of New York Application November 15, 1945, Serial No. 628,847

4 Claims. (Cl. 250—27)

This invention relates broadly to pulse signaling systems and is particularly useful in television systems wherein the sound is transmitted during the line fly-back intervals.

There have been suggested heretofore various systems of signaling, for communcation purposes, wherein audio signals are transmitted in the form of pulses, rather than as continuous modulations of a carrier. In general the pulses are short compared to the intervening intervals, and the transmitted wave may consist of bursts of the carrier frequency whose amplitudes vary in accordance with the audio frequencies. At the receiver, the signal is amplified and detected to obtain pulses whose amplitudes vary in accordance with the intelligence to be communicated. Other forms of transmitted waves may be employed, and the signals converted at the receiver to pulses whose amplitudes vary in accordance with the audio frequencies to be reproduced.

In television it has been proposed to transmit the video signal and the accompanying sound on the same carrier, utilizing the line fly-back intervals for pulse communication. This has the advantage of avoiding the use of a second radio frequency carrier and hence simplifies the transmission and reception of the signals. While it is possible to employ amplitude modulated pulses on the carrier during the line fly-back intervals, it is preferred to employ frequency modulation. This permits more effective usage of the transmitter power and improves the signal-to-noise ratio of the sound transmissions. At the receiver, the frequency modulated sound transmissions are converted to amplitude modulated pulses and these pulses reproduced by a conventional audio amplifier.

The fidelity which is obtainable by such a pulse transmission system is limited by the pulse recurrence frequency (PRF). It is usually considered that the PRF should be at least twice that of the highest frequency it is desired to transmit. The new television standards which are proposed to be employed in the frequency band from 480 to 960 megacycles provide for a line frequency of 22 kilocycles per second for black-and-white, and 31.5 kilocycles per second for color television. These line frequencies permit a corresponding PRF for pulse transmission which is sufficiently high to provide excellent sound fidelity.

In pulse communication reproducing systems heretofore suggested, the detected pulses are commonly applied to a low-pass filter which rejects the PRF of the pulses and higher harmonics, and permits only the audio variation to be amplified and reproduced. Since the pulses are short compared to the intervening intervals, the average audio power is relatively low and considerable amplification must be employed in order to obtain a sufficiently loud signal. Also, since the peak ampitude is large compared to the average value, there is a strong tendency for the production of non-harmonic side tones, with resultant distortion.

The present invention provides a method and apparatus for the storage of the signal pulses so as to increase greatly the average audio power in the stored signal, thus requiring considerably less audio amplification for a satisfactory volume output. Indeed, it makes possible a receiver efficiency for pulse transmission which is comparable to that obtained with continuous transmission. In addition, the storage greatly reduces the tendency for the production of non-harmonic side tones, and hence increases the fidelity of the reproduced sound. This is particularly important in television, where high quality is expected in the receiver. The conventional low-pass filter may be dispensed with, due to the decreased distortion, with resultant saving.

In accordance with the invention, the received pulses are amplified and detected, and separated from the video signal in the case of television, to obtain resultant amplitude varying pulses. These pulses are supplied to a storage capacitor through an electronic circuit adapted to allow current flow in either direction. The electronic circuit in general contains at least two electronic tube sections, and the tube sections are connected to provide at least two paths for current flow between the source of signal pulses and the capacitor, for flow in either direction therebetween. In this manner the charge on the storage capacitor, and hence the voltage across the capacitor, may be changed in either direction in response to the applied signal pulses. This is especially important for a balanced signal input, since the charge on the storage capacitor can be made positive or negative in accordance with the polarity of the input pulses.

Preferably the paths for current flow for charging or discharging the storage capacitor during the signal pulses have time constants with the storage capacitor which are not substantially greater than the duration of the signal pulses. In this manner the capacitor charge may be changed quickly to different values. Between pulses, however, current flow to and from the capacitor should be sufficiently limited to prevent the capacitor from becoming discharged. This may be accomplished by making the circuit of sufficiently high impedance so that the time constant for current flow to and from the capacitor is sufficiently long to allow substantial storage of charges on the capacitor. Time constants several times the interval between pulses provide satisfactory storage, although they may be varied over wide ranges depending upon the completeness of storage required.

In certain of the embodiments of the invention, keying pulses are produced having the periodicity of the signal pulses and having a duration approximately that of the signal pulses. These keying pulses are applied to the circuit so that the two paths are conductive during the signal pulses. Thus current may flow to and from the capacitor quickly during the signal pulses so as to change the charge stored thereon rapidly. However, as soon as a signal pulse ends, the corresponding keying pulse terminates, and the two paths are returned to a condition of relatively low conductance so as to insulate the capacitor and insure that the stored charge thereon is not substantially dissipated until the next pulse comes along. This permits the storage capacitor to be charged to very nearly the potentials of the signal pulses, and these potentials are maintained very nearly unchanged until succeeding pulses come along. This may be termed "Peak storage detection."

Other embodiments of the invention employ self-keying. In these circuits the storage capacitor is in general not charged to the full value of the signal pulses and storage is not quite as constant. The output of these circuits requires somewhat more amplification than those employing separate keying. Non-harmonic side tone production is still greatly reduced so that the use of these circuits is advantageous.

It has also been suggested heretofore to transmit several pulse trains with different PRF, or with the same PRF but different phases, concurrently over a single channel, for example on the same carrier, so as to transmit several messages at the same time. The circuits employing separate keying pulses may advantageously be used in such a system, since by changing the PRF or the phase of the keying pulses, they may be made to recur at the time instants of the signal pulses of any desired pulse train. In this manner any of the several pulse trains may be selected. In the case of a single train of pulses of varying PRF, the PRF of the keyed circuits may be varied in similar manner, or self-keyed circuits used.

The invention will be more clearly understood by reference to the following detailed description, taken in conjunction with the drawings, in which:

Fig. 1 is a circuit diagram utilizing a keyed double triode, and Fig. 2 shows various wave forms thereof;

Fig. 3 is a diagram, partially schematic, of a television receiver utilizing the circuit of Fig. 1, and Fig. 4 shows various wave forms thereof;

Fig. 5 is another embodiment of the invention using a keyed diode bridge;

Fig. 6 is another form of the invention employing a self-keyed double triode circuit, and Figs. 7a and 7b show certain wave forms thereof;

Fig. 8 shows a self-keyed double diode circuit, and Figs. 9a and 9b show certain wave forms thereof; and Fig. 10 shows a further modification of a self-keyed double diode circuit.

Referring now to Fig. 1, a source of modulated signal pulses 10 is shown whose output is a series of pulses with amplitudes varying in accordance with the intelligence to be reproduced, as shown in Fig. 2b. It may be a receiver for ordinary pulse communication use, or may be part of a television receiver which selects the sound pulses, amplifies and detects them, and supplies an output in the form of pulses of varying amplitude. Any convenient magnitude of pulses may be employed, 10–20 volts having been used with success. The pulses are shown as rectangular, but it will be understood that in any normal receiver they may be rounded off somewhat, and perhaps distorted.

Also provided is a source of keying pulses 11 whose output is similar to that shown in Fig. 2a, and consists of pulses of the same periodicity and phase as the signal pulses, but of constant amplitude. Keying pulses may be derived from the signal pulses, as by amplification and clipping, or may be locally generated and synchronized with the signal pulses in any desired fashion, for example by using the line synchronizing signals in the case of television.

A storage capacitor 12 is also provided on which the peak values of the signal pulses are to be stored. Between the source of signal pulses 10 and storage capacitor 12 is an electronic circuit comprising the double triode 13. The double triode contains two electronic tube sections 1, 2 having respective cathodes $K_1$, $K_2$, anodes or plates $P_1$, $P_2$, and control grids $G_1$, $G_2$. The two electronic tube sections are shown within the same envelope, as a double triode, since that is the usual practice at the present time. However, each electronic tube section could be enclosed in its own envelope, forming an ordinary triode tube, and it will be understood that the term "electronic tube section" applies in either case. Heater circuits are not shown, since they are obvious to those in the art.

The two electronic tube sections are connected to provide two paths for current flow between source 10 and capacitor 12, and the anodes and cathodes are connected in reverse so as to allow current flow in opposite directions in the two paths. Thus, under suitable conditions of energization, current may flow in either direction between source 10 and capacitor 12, so that both magnitude and polarity of the charge on capacitor 12 may be varied in accordance with the input signal pulses. Stated differently, charges may overflow in both directions between signal source and storage capacitor.

The source of keying pulses 11 is connected to the grids $G_1$, $G_2$ of both sections of the double triode through the capacitor-resistance coupling network 14, 15. Resistance 15 is shunted to the output of the signal pulse generator, although it may be shunted to ground if desired. The connection shown is advantageous for signal pulses which are not balanced to ground, since it reduces the magnitude of the keying pulses required for good operation.

The output of the storage circuit is shown here as connected to a sound amplifier 16 and loudspeaker 17 for reproduction of the audio modulation.

To understand the operation of the circuit, assume first that the capacitor 12 is uncharged and that the signal pulses of Fig. 2b are applied to $P_1$ and $K_2$. The first signal pulse 18 will make $P_1$ positive with respect to $K_1$ and $K_2$ positive with respect to $P_2$. Hence, current can flow in the first tube section but not in the second. At the same time, the first keying pulse 19 is applied to the two grids to drive them positive. The positive grid peak voltage will be limited by grid current flow from the cathode with lowest potential.

The potentials applied to $G_1$ by keying pulse 19, and to $P_1$ by signal pulse 18, will render the first tube section conductive and allow current to flow from the source of signal pulses 10 to the capacitor 12. The amount of charge placed on capacitor 12 will depend upon the time constant of the capacitor and the resistance of the charging circuit (output circuit of source 10 and the first tube section), as well as on the magnitude and duration of the signal pulse 18. This time constant is preferably made short enough so that the capacitor 12 is charged very nearly to the potential of signal pulse 18 before the pulse terminates.

As capacitor 12 is charged, its potential is applied to $K_1$ and $P_2$ of the tube sections. Upon the termination of signal pulse 18, $P_1$ and $K_2$ are returned to ground potential. Thus $P_1$ becomes negative to $K_1$ so that no current can flow, but $K_2$ now becomes negative to $P_2$. Current should not flow through the second tube section sufficiently to discharge capacitor 12, and this is prevented by the termination of keying pulse 19 which drives the grids negative to $K_2$ and thus effectively cuts off the second tube section. It is advantageous to make the keying pulses sufficiently large to insure that both tube sections will be cut off in the intervals between pulses so that the charge stored on capacitor 12 is not dissipated. For example, keying pulses equal to or somewhat greater than the peak-to-peak value of the signal pulses may be employed. In effect, the capacitor is insulated from the signal source between pulses.

Complete storage, although desirable, is not necessary, so that it would be possible to allow some current to flow through the tube sections in the intervals between pulses provided the paths are of sufficiently high impedance (or of sufficiently low conductance) to allow substantial storage of charges on the storage capacitor. The decay would be determined by the time constant of the capacitor in conjunction with the resistance of the discharge path, which is preferably equal to or greater than the interval between pulses.

For signal pulses of increasing magnitude, tube section 1 will be rendered conductive for each pulse and the charge on storage capacitor 12 increased each time. When, however, the signal pulses start to decrease in magnitude, tube section 2 becomes conductive. For example, consider that the storage capacitor has been charged to the potential of signal pulse 21 (Fig. 2b) and that signal pulse 22 of smaller magnitude then arrives. $P_1$ will then be negative to $K_1$ so that the first tube section will not conduct. However, $K_2$ will be negative to $P_2$ so that the second tube section can conduct provided the corresponding keying pulse 23 is applied to $G_2$. Hence, the charge on storage capacitor 12 will be quickly reduced to the value of signal pulse 22. The second tube section will continue to conduct during the signal pulses as the pulses decrease in magnitude.

It will be apparent that the keying pulses in general place the tube sections in condition to respond to the applied signal pulses. The signal pulses then render conductive one or the other paths, depending on the relative potentials of signal pulses and capacitor, so as to cause current to flow and vary the capacitor charge in accordance with the signal pulses.

The duration of the keying pulses is advantageously of the order of that of the signal pulses. Somewhat longer keying pulses have been employed with success, but care should be taken to avoid too much loss of charge on the storage capacitor before the keying pulses cut off the tube sections. Shorter keying pulses may be employed, but in such case the time available for changing the charge on the capacitor is shortened and if the time constant of the circuit during the pulses is not short enough the capacitor will not reach its full charge. This may decrease the volume output and also attenuate the high frequencies to an undesired degree.

The result of the storage is shown in Fig. 2c, where the full wave 24 shows the stored values on capacitor 12. The dotted line 25 shows the envelope of the modulating wave, and it will be observed that the stored wave approximates wave 25 in the form of enveloping squares. The slight phase displacement is unnoticeable to the ear. The magnitude of the ripple frequency of the enveloping squares is only a fraction of that of the unstored pulses, so that no filter is ordinarily required to eliminate it.

The stored wave 24 may be compared to the dotted wave 26 in Fig. 2b, which represents the average of the unstored pulses. For pulses lasting 10% of the pulse interval, the average is about 10% of the peak value. This is the wave which would be applied to the audio amplifier in the usual case, and the average is, of course, far less than is represented by wave 24 (about 10% under the above assumptions). Thus the storage results in a greatly increased volume for a given degree of amplification of the audio amplifier. Also, a very important consideration is that the tendency for side tone distortion is greatly reduced due to the storage effect, since the ripple amplitude is small compared to the variations of the unstored pulses.

Since capacitor 12 may be charged either positively or negatively through the double triode circuit, it is possible to use the circuit with a balanced input signal pulse wave. Such a balanced wave is shown in Fig. 2d. The dotted wave 27 is an audio frequency representing the envelope of the pulses, and the full wave 28 in Fig. 2e represents the stored signal output. This approximates the audio frequency in the form of enveloping squares. The wave of Fig. 2d will usually be balanced to ground and, with one terminal of capacitor 12 grounded, the other terminal will vary both positively and negatively to ground. For such an input, instead of connecting resistance 15 to the output of souce 10, it could be grounded without materially affecting the operation of the circuit. A variation would be to bias the balanced pulse input to a given potential other than ground such that the pulses vary positively and negatively to the given potential. In such case, instead of grounding the storage capacitor 12, the grounded teminal could be maintained at the given potential. The operation of the circuit under such conditions will be readily apparent from the above detailed description.

It will be apparent that the input of the sound amplifier 16 should be of high impedance so that the charges stored on capacitor 12 will not be dissipated to an undesirable extent between signal pulses. The output lead 29 may be connected directly to the grid of the input tube of amplifier 16 without a resistance from grid to ground, or, if a grid resistance is employed, it may be made of sufficiently high value to provide a time constant with capacitor 12 which is sufficiently long to allow substantial storage of charges on the capacitor.

As pointed out previously, the size of storage capacitor 12 should be chosen with respect to the circuit constants during signal pulses so that the time constant of the current flow is sufficiently short, preferably not substantially greater than the pulse duration. Too large a capacitor is found to impair the high fequency response. The smaller the capacitor required by this consideration, the larger must be the resistance of the circuit constants between pulses so as to give a time constant sufficiently long to allow substantial storage. Preferably the latter time constant is at least equal to the interval between pulses, and advantageously several times the interval. If required, the input stage of amplifier 16 may be a cathode follower, so as to give a very high input impedance.

As a specific example, the following values have been successfully used in practice, it being understood that the example is given for illustrative purposes and not by way of limitation, since wide variations are possible depending on the particular use contemplated.

PRF—31.5 kc.
Pulse length—approximately 10% of pulse interval
Tube 13—6SN7
Storage capacitor 12—500 micromicrofarads
Capacitor 14—250 micromicrofarads
Resistance 15—250 kilohms In case it is desired to receive one of several trains of pulses having different PRF, the source of keying pulses 11 may be made of variable PRF. By adjusting the PRF of the keying pulses, any desired train of signal pulses may be selected and the others rejected, since the keying pulses will maintain the tube sections beyond cutoff during undesired signal pulses. Furthermore, if the PRF of a desired signal pulse train is varying, the source of keying pulses may be caused to vary in like manner and hence allow storage reception. If different pulse trains of the same PRF are transmitted in different phase relationship to a synchronizing train of pulses, the phase of the keying pulses may be varied to pick up a desired pulse train.

Referring now to Fig. 3, a circuit is shown in which the invention is part of a television receiver. Received television signals are amplified and detected in 31 and the video separated from the sound pulses. The video is supplied to a reproducer (not shown) through lead 32. The sound is assumed to be in the form of FM pulses and is separated in the selector 33 and supplied to the FM discriminator indicated generally as 34. This is a conventional FM discriminator including a tuned input circuit comprising a variable capacitor 35 and the primary 36 of a transformer 37. The input end of the primary is connected through capacitor 38 to the midpoint of the secondary coil 39. The secondary circuit is also tuned by a variable capacitor 41. Double diode 42 is fed from the tuned secondary and is provided with output resistances 43 and 44, shunted by capacitor 50. The functioning of such a discriminator is well known in the art and need not be explained here.

Fig. 4a shows the video signal input at point a in Fig. 3. It comprises line synchronizing pulses 55, FM sound pulses 56, and line video signals 57. Fig. 4b shows the FM sound pulses at b in Fig. 3. The output of the discriminator is in the form of pulses of varying amplitude, shown in Fig. 4c, corresponding to point c on the diagram of Fig. 3. These pulses of varying amplitude are applied to a circuit containing a double triode 45 and storage capacitor 46, similar to that of Fig. 1.

The keying pulses are obtained from the FM sound pulses which are supplied to the primary of transformer 47 in series with the input of the discriminator circuit. The secondary of transformer 47 is connected to the plates 48 of a double diode in the duplex diode-triode tube 49. The cathode of tube 49 is grounded and the midpoint of the secondary is grounded through resistance 51. This is a conventional rectifier circuit and results in rectifying the FM sound pulses of Fig. 4b in the form shown in Fig. 4d. The rectified pulses are negative and are applied directly to the grid of the triode portion of tube 49. The pulses are made of sufficient amplitude to drive the tube beyond cutoff and results in squaring the voltage pulses on the plate of tube 49, as shown in Fig. 4e. These output pulses are positive and constant in amplitude, and form keying pulses for the double triode 45, being supplied to the latter through the coupling circuit 52, 53. Resistance 53 is grounded, since the output of the discriminator circuit is balanced to ground, as discussed hereinbefore. Separate rectifier and amplifier tubes may be employed in place of the duplex tube, if desired.

The storage circuit functions in the same manner as that of Fig. 1 and need not be described again. For a pulse wave as shown in Fig. 4c, a resultant storage wave will be obtained as shown in Fig. 4f. This stored wave is applied to amplifier 54 for reproduction.

It will be understood that any other means for deriving the keying pulses may be employed, as desired. In some cases pulses may be employed in separating the sound pulses from the video which are also suitable for keying pulses in the storage circuit. This results in economy in receiver design.

Referring now to Fig. 5, a storage circuit is shown employing a keyed diode bridge circuit 61. Signal pulses are supplied from the pulse receiver 62 to terminal 63 of the diode bridge. The storage capacitor 64 is connected to the opposite terminal 65 of the bridge. Keying pulses are supplied from the keying pulser 66 through a pulse transformer 67 to the other two terminals 68 and 69 of the bridge. Resistance 71 shunted by capacitor 72 provides bias, as will be described shortly. The keying pulses may be derived from the signal pulses as indicated in Fig. 5, or may be generated separately in any of the ways discussed in connection with Fig. 1.

In operation, positive keying pulses applied to terminals 68, 69 make the plates $P_1$—$P_4$ of the diodes in the bridge positive to the cathodes $K_1$—$K_4$ and hence place them in conductive condition. When this occurs, since the bridge is symmetrical, any differences in potential between terminals 63 and 65 are quickly equalized by current flow through the bridge. The diodes are connected for current flow in opposite directions between the terminals 63 and 65 so that the charge on capacitor 64 may be changed in magnitude and made positive or negative in accordance with the signal pulses applied to terminal 63.

During the interval the keying pulse is applied to the bridge, current flows through resistance 71 and places a charge on capacitor 72. The charge on capacitor 72 has a polarity which tends to buck the applied voltage, so that when the keying pulse terminates, terminal 68 is made negative to 69 and results in cutting off current flow through the diodes. Hence, there can be no substantial dissipation of the charge on storage capacitor 64 during the intervals between keying pulses. Some dissipation of the charge would be permissible as explained in connection with Fig. 1, and similar considerations for keying pulse width apply.

The stored signal wave is applied to the audio amplifier 70 through output lead 60 for reproduction.

The frequency or phase of the keying pulses may be varied for receiving different or variable pulse trains, as discussed in connection with Fig. 1.

The embodiments of the invention described above employ separate keying pulses for the signal storage circuit. Instead of using such separate keying pulses, it is possible to employ self-keying circuits in which the desired keying pulses are derived from the signal pulses by suitable circuit elements connected to the tube sections.

Referring to Fig. 6, an arrangement is shown employing a source of signal pulses 10 and a storage capacitor 12, between which is an electronic circuit including a double triode 13. The triode is connected to provide two paths for current flow between the source and capacitor, with plate and cathodes connected in reverse to allow current flow in either direction. Instead of applying separate keying pulses to the grids of tube 13, circuits are provided for producing, in effect, self-keying of the tube sections. The grids of each section are connected to the plates through capacitors 81 and 82, respectively, and to the cathodes through resistances 83 and 84, respectively. The time constant of each circuit may advantageously be of the order of the interval between pulses, a time constant about one and one-half times the pulse interval having been used successfully. However, considerable variation is possible.

The operation of the circuit of Fig. 6 may be understood more readily by referring to the wave forms of Fig. 7 in conjunction with the following explanation.

Fig. 7a represents a series of signal pulses of arbitrary value and polarity. Assume first that pulse 85 is applied to the input, with capacitor 12 discharged. Cathode $K_2$ will be driven positive to $P_2$ so that the second tube section will not conduct. Plate $P_1$, however, will be driven positive to $K_1$ and, since the potential across capacitor 81 cannot change instantaneously, $G_1$ will also be driven positive momentarily. The first tube section will therefore be placed in a highly conductive condition and capacitor 12 will be charged toward the potential of the pulse, as shown at 80 in Fig. 7b. The rate of charge will be determined by the time constant of the path through the tube and the capacitor 12, but this can ordinarily be made sufficiently short for the purpose.

Since $G_1$ is positive to $K_1$, a conductive path is provided for the quick charge of capacitor 81. Hence the potential of $G_1$ to ground will decrease toward that of capacitor 12 during the pulse period. Upon the termination of the pulse, $P_1$ is returned to ground potential and $G_1$ is carried negative to ground due to the capacitor 81. Cathode $K_1$ will then be somewhat positive to plate and grid so that the first tube section will be non-conductive. Thus the charge transferred to capacitor 12 will be stored there. Some leakage may exist through the second tube section, since plate $P_2$ will be somewhat positive to $K_2$, but it is found that this leakage does not seriously affect the storage effect and is indeed desirable under some conditions. The charge on capacitor 81 may leak away through resistance 83 between pulses, at a rate determined by the time constant of the circuit. This may be made equal to, or somewhat greater than, the interval between pulses, with advantage.

When a larger positive pulse 90 arrives, $P_1$ and $G_1$ will once more be driven positive and capacitor 12 will be charged to a higher potential in accordance with the increased value of the signal pulse. Upon the termination of the pulse, $G_1$ will once more be driven below the potential of $K_1$ and will cut off the first tube section. During the interval until the next pulse arises, the negative potential on $G_1$ may again leak away through resistance 83 toward the potential of capacitor 12.

When a negative signal pulse 91 arrives, $P_1$ is driven negative to $K_1$ and hence the first tube section will not conduct. In the second tube section, $K_2$ will be driven negative to $P_2$ and, since $G_2$ will remain momentarily at its previous potential, the second tube section will conduct and capacitor 12 will be charged negatively in accordance with the new signal pulse. Upon the termination of the pulse $K_2$ will be returned to ground potential, which is positive to $P_2$, and hence the second tube section will become non-conductive. While the pulse lasts, a conductive path will exist between $K_2$ and $G_2$, so that capacitor 82 will become charged and drive grid $G_2$ negative to ground. Upon the termination of the pulse, the negative charge on capacitor 82 may leak away toward ground through resistance 84, the time constant being subject to considerations similar to that of the capacitance-resistance circuit 81, 83.

It will be apparent that the circuit of Fig. 6 will follow the signal pulses in both positive and negative directions, and for different values of the pulses. The capacitor-resistance circuits 81, 83 and 82, 84, due to their time constants, render the tube paths of sufficiently high impedance in the intervals between pulses to allow substantial storage of charges on capacitor 12.

The over-all stored wave is shown in Fig. 7b and results in considerable increase in average power and considerable decrease in the tendency for side harmonic distortion. It is found that the capacitor 12 may not be charged to the full value of the incoming signal pulses, but values of the order of 60 per cent have been obtained without difficulty.

As an example of a specific circuit which has been operated satisfactorily, the following values are given, it being understood that they are given for illustrative purposes only, and are not intended to limit the invention thereto:

PRF of signal pulses—31.5 kc.
Pulse length—approx. 10% of pulse interval
Tube 13—6SN7
Storage capacitor 12—1,000 micromicrofarads
Capacitors 81, 82—200 micromicrofarads
Resistances 83, 84—250 kilohms When using the above constants, it was found that excellent fidelity of reproduction could be obtained, with increased volume due to the storage effect and decreased distortion from overtones and beat frequencies. If desired, capacitors 81, 82 may be increased somewhat, and resistances 83, 84 correspondingly reduced.

It is possible to employ double diodes, instead of double triodes, for storage purposes in self-keyed circuits, provided some loss in volume is accepted. One such circuit is shown in Fig. 8, in which a double diode 93 is connected between a source of signal pulses 10 and storage capacitor 12. The diode sections are connected in reverse to provide for flow of current in either direction between source and capacitor. Cathodes $K_1$ and $K_2$ are connected to the plates of the opposite sections, $P_2$ and $P_1$, respectively, through capacitors 86 and 87. These capacitors are shunted by resistances 88 and 89.

In operation, assume that the train of pulses shown in Fig. 9a is applied to the input. The first positive pulse 94 will drive cathode $K_2$ positive to $P_2$ and hence the second section will not conduct. Simultaneously, since the voltage across capacitor 86 cannot change instantaneously, the positive signal pulse will be applied to plate $P_1$ and drive it positive to $K_1$. Hence the first section will conduct and the input signal voltage will divide between capacitor 86 and storage capacitor 12. Upon termination of the pulse, $P_1$ will be driven negative to $K_1$ and cut off the first tube section. The amount by which capacitor 86 is charged during the pulse will determine the negative potential of $P_1$ at the termination of the pulse. This charge will be dissipated through the current path provided by resistance 88, preferably with a time constant of the order of the pulse interval, or greater.

Upon the termination of pulse 94, some leakage may exist from capacitor 12 to ground through the second tube section. However, the time constant of this discharge can be sufficiently long so that substantial storage is obtained. With a more positive pulse 95 applied to the input, the action described above recurs and the new signal potential is divided between capacitor 86 and capacitor 12, thus increasing the charge stored on capacitor 12.

For a negative pulse 96, $P_1$ is driven negative, thus maintaining the first tube section below cutoff, but $K_2$ is driven negative to $P_2$, thus allowing the negative signal to be impressed across capacitors 87 and 12 so as to charge storage capacitor 12 negatively. This is shown at 97 in Fig. 9b. Upon termination of the pulse $K_2$ returns to ground potential, but $P_2$ stays negative due to the charge on capacitors 87 and 12. The charge on 87 may be dissipated through resistance 89 between pulses, as explained for the capacitance-resistance circuit 86, 88. A more negative pulse will charge the storage capacitor 12 more negatively through the second section of the tube. After a negative pulse some leakage may exist through the first tube section, but this will have a relatively long time constant as explained above. It is desirable not to make capacitor 12 too large to avoid serious attenuation of high frequency components.

As another specific example of values which have been found satisfactory, for signal pulses of 31.5 kc. and a 6H6 double diode, a storage capacitor 12 of 1,000 mmf., capacitors 86, 87 of 100 mmf., and resistances 87, 88 of 1 megohm have been employed with success.

Fig. 10 shows a further embodiment of the double diode which is similar to the circuit of Fig. 8 except that instead of connecting the resistances across capacitors 87, 88, they are connected from plate to cathode of respective diodes. The circuit functions very similarly to that of Fig. 8 and hence detailed explanation will not be given. It suffices to point out that a positive signal pulse will charge capacitor 12 through the first section of the diode, since $P_1$ is driven positive, the voltage dividing between capacitors 86 and 12. The second section is non-conducting since $K_2$ is driven positive to $P_2$. A negative signal pulse drives $P_1$ negative to $K_1$ so that the first section does not conduct, but drives $K_2$ negative to $P_2$ to render the second section conductive. The pulse voltage is hence applied across capacitors 87 and 12 in series, and the voltage across capacitor 12 is determined by voltage division between the two capacitors.

In the circuits of Figs. 8 and 10, it is found that the voltages stored on the storage capacitor during pulses are a somewhat smaller fraction of the input signal pulses than is the case of the double triode arrangement of Fig. 6. Hence additional audio amplification may be required. The circuits have great value, however, in decreasing distortion. The circuits employing separately produced keying pulses, such as shown in Figs. 1–5, result in somewhat more complete storage and hence greater volume, but require, of course, some means of producing the keying pulses. If separate tubes and circuits are required for this purpose it may be more economical in many instances to utilize the self-keyed circuits. However, in many instances suitable keying pulses will be generated in a receiver for other purposes, so that the keyed circuits may be used without much additional expense.

It will be appreciated that many changes in the circuits given as illustrations may be made within the scope of the invention. Also, circuit constants may be chosen to meet the needs of any particular application.

I claim:

1. In pulse signaling, apparatus for producing a stored modulation signal output which comprises a source of amplitude modulated signal pulses, a storage capacitor, a circuit including a plurality of electronic tube sections connected between said source and the storage capacitor providing paths for the flow of current therebetween in either direction, means for deriving keying pulses from said signal pulses and applying the keying pulses to said circuit to allow flow of current between said source and capacitor during said signal pulses, said paths being of sufficiently low conductance between said keying pulses to allow substantial storage of charges on the storage capacitor, whereby a stored signal output of amplitude varying in accordance with the signal pulse amplitudes may be obtained.

2. In pulse signaling, apparatus for producing a stored moduation signal output which comprises a source of amplitude modulated signal pulses, a storage capacitor, a pair of electronic tube sections in circuit between said source and the storage capacitor providing two paths for current flow therebetween, said tube sections each having at least anode, cathode and control grid and being connected for opposite directions of current flow in said two paths, means including said signal pulses to energize the tube sections during the pulses to provide a conductive path to change the charge on said storage capacitor in accordance with the signal pulse amplitudes, and circuits including capacitors having time constants not substantially less than the intervals between pulses connected to said tube sections to render the tube paths of sufficiently high impedance in said intervals to allow substantial storage of charges on the storage capacitor, whereby a stored signal output of amplitude varying in accordance with the signal pulse amplitudes may be obtained.

3. In pulse communication, apparatus for producing a stored modulation signal output which comprises a source of amplitude modulated signal pulses whose amplitudes vary in accordance with audio frequencies to be reproduced, a storage capacitor, a pair of electronic tube sections in circuit between said source and the storage capacitor providing two paths for current flow therebetween, said tube sections each including at least anode, cathode and control grid and being connected for current flow in opposite directions in said two paths, capacitors in circuit between the anodes and control grids of respective tube sections, and resistances connected to provide respective current paths for the last-named capacitors of time constants not substantially less than the intervals between signal pulses, whereby the charge on said storage capacitor may be altered in accordance with varying amplitude signal pulses during said pulses with substantial storage therebetween.

4. In pulse communication, apparatus for producing a stored modulation signal output which comprises a source of amplitude modulated signal pulses whose amplitudes vary in accordance with audio frequencies to be reproduced, a storage capacitor, a pair of electronic tube sections each having cooperating anode, cathode and control grid, capacitors in circuit between the anodes and control grids or respective sections, a connection for supplying signal pulses from said source to the anode of one section and the cathode of the other, a connection from the cathode of said one section and the anode of the other to the storage capacitor, and resistances connected to supply respective current paths for the second-named capacitors of time constant not substantially less than the intervals between signal pulses, whereby the charge on said storage capacitor may be altered in accordance with varying amplitude signal pulses during said pulses with substantial storage therebetween.

KURT SCHLESINGER.

REFERENCES CITED

The following references are of record in the file of this patent:

UNITED STATES PATENTS

| Number | Name | Date |
| --- | --- | --- |
| 2,266,194 | Guanella | Dec. 16, 1941 |
| 2,307,375 | Blumlein et al. | Jan. 5, 1943 |
| 2,335,265 | Dodington | Nov. 30, 1943 |
| 2,339,536 | Wendt | Jan. 18, 1944 |
| 2,358,545 | Wendt | Sept. 19, 1944 |
| 2,419,696 | Smith | Apr. 29, 1947 |
| 2,421,025 | Grieg | May 27, 1947 |